Patented Mar. 30, 1943

2,315,125

UNITED STATES PATENT OFFICE 2,315,125

OVERSPRAY RECOVERY PROCESS

Joseph G. Meckler, Detroit, Mich.

No Drawing. Application September 12, 1938,
Serial No. 229,571

2 Claims. (Cl. 106—287)

My invention relates to a new and useful improvement in an overspray recovery process adapted for use in a recovering of the overspray of lacquer, synthetics, varnish, and the like which are produced when such finishes are being sprayed upon a body to be finished.

The overspray referred to is most commonly found in spray booths. In spraying articles with lacquer, paint, or the like, the material sprayed on the articles, may be termed "a finish." A certain amount of this material which is being sprayed, will miss the article being sprayed, and in some cases will fly off the article after striking it, and this loose, very finely divided paint, lacquer, or other finish, is termed "overspray" or "finish overspray." In the construction of these spray booths there was originally provided a ventilating mechanism embodying an exhaust conduit for carrying the overspray away from the booth.

It was recognized that the overspray, so exhausted, amounted to a considerable quantity and means were resorted to for preventing the passage of the overspray through the exhaust conduit. One of these means was to discharge from near the ceiling of the spray booth a curtain of water so that the exhaust was effected through the curtain of water. The result was that the spray of water served to wash down, onto the floor, the overspray which otherwise would have been exhausted through the exhaust conduit.

The present invention has as its object the recovery of this overspray which is washed down by the spray of water.

Some attempt has been made to recover such washed down overspray but in the recovery process which is known to me the washed down overspray is first subjected to a dehydrating operation. The washed down overspray generally forms a sort of "curdy" mass, similar to an emulsion containing the paint solids, some solvent and water. A common way of collecting this "curdy" mass is by means of weirs set in the water overflow stream or by means of settling basins. The "curdy" mass floats on top of the water and when settling basins are used this "curdy" mass, which will be termed sludge, may be skimmed off the top of the water.

In the process as now practiced after sludge is obtained it is subjected to a dehydrating operation in a basket type centrifuge. During the centrifuging operation a large portion of the water is drawn off together with some solvent. The centrifuged sludge is then mixed with solvents with which it may go into solution in order to be ready for re-using.

Thus, it is seen that in the recovery process an attempt is made to dehydrate the sludge. I have discovered that this is an unnecessary step and that the water contained by the sludge is a desirable element. In my process the sludge is collected in the manner referred to. There is then added to this sludge the proper stabilizing agent, sometimes additional water and, if necessary, additional solvent. The additional solvent is generally used to replace the solvent which was lost during the spraying operation. The entire mixture is then emulsified and is ready for re-use.

The water contained by the washed down overspray thus becomes an important factor in the recovery process as the sludge is, in reality, a form of water emulsion of the overspray. This overspray, of course, is the finish which is used in an atomized condition and because of its atomized condition, it easily forms a sort of emulsion union with the water. This process, therefore, recognizes the fact that washing the overspray down by a spray of water has constituted the first step in the recovery process.

It is believed obvious that considerable saving in labor, handling, and material may be effected by my process. This will appear from a comparison of the commonly practiced process of recovery and the present invention.

For instance, in the present method of recovery a lacquer sludge of unknown composition was delivered from the centrifuge into a mixing machine.

To 120 pounds of centrifuged sludge was added 5 gallons of ethyl alcohol, 3½ gallons butyl alcohol, 1½ gallons ethylene glycol monobutyl ether, commonly sold on the market under the trade name "butyl cellosolve," 1 gallon ethylene glycol monoethyl ether acetate, commonly sold under the trade name "cellosolve acetate," 6½ gallons butyl acetate, 5 gallons ethyl acetate and 25 gallons toluol. This mixture was thoroughly agitated and mixed together and then strained yielding 50 to 55 gallons of product.

In practicing the present invention a lacquer ready for use in spraying was used, the lacquer having the following composition to wit:

| | Gallons |
|---|---|
| 25% 5–6 second nitrocellulose solution | 4½ |
| 50% cut by weight of Beckacite 1111 (a non-phenolic synthetic resin) | 3 |
| Dibutyl phthalate | ½ |
| Beckosol 1320 (a phenol modified alkyd of the drying type) | ⅞ |
| Butyl alcohol | 2½ |
| Butyl acetate | 6 |
| Ethyl acetate | 1½ |
| Toluol | 14 |

The sludge recovered from the overspray in the use of this lacquer consisted of about 2 parts lacquer and 1 part water. Part of the lacquer thinner had been lost in spraying. To four pounds of this sludge, taken directly from the spray booth, was added 3/16 of an ounce of Aerosol OT (trade name for a manufacturer's particular brand of sodium salt of dioctyl sulpho-succinate), 1/2 pound water, 3/4 pound methyl n-amyl ketone, 1/4 pound butyl alcohol and 1/8 pound butyl lactate.

The Aerosol OT ester, methyl n-amyl ketone, butyl alcohol, and butyl lactate was, of course, used as a thinner and solvent being added in substantially the proportion necessary to restore the solvent lost in spraying. The entire mixture was then emulsified to provide an easily sprayable emulsion, and when sprayed it dried to a clear smooth film in the air. The drying operation might, of course, be aided by low heat.

Butyl acetate has been used successfully in place of methyl n-amyl ketone, and it is believed obvious that any other solvent combinations could be used for this particular lacquer but the disclosure is made as merely representative of composition which could be used.

Another lacquer has been used having the following composition, to wit:

| | Pounds |
|---|---|
| 25% 5–6 second nitrocellulose solution | 30 |
| Beckosol 1323 (a non-drying type of pure alkyd) | 20 |
| Dibutyl phthalate | 2 |
| Octyl acetate | 12 |
| Butanol (butyl alcohol) | 15 |
| Xylol | 12 |
| Hexone (a methyl isobutyl ketone) | 12 |
| Butyle acetate | 10 |
| Toluol | 35 |

The ingredient referred to in the formulae set out above as "toluol" is the ingredient commonly sold under this name, this ingredient being—toluene or methyl benzene. A commercial product derived from the destructive distillation of coal, usually a mixture of ortho, meta and para xylenes, or ortho, meta and para di-methyl benzenes; is commonly sold under the trade mark "Xylol."

After spraying the collected sludge consisted of ⅔ lacquer and ⅓ water. 10 pounds of sludge were added, ½ ounce triethanolamine, ¼ pound acetone and one pound water. After emulsifying these ingredients together and spraying, clear glossy films resulted, whether the finish was air-dried or baked.

With alkyds the following clear synthetic enamel was used to wit:

| | | |
|---|---|---|
| Beckosol 1333 (a pure alkyd of the drying type) | gallons | 12 |
| Rezyl 420–5 (a pure alkyd of the drying type) | gallons | 3 |
| 6% cobalt naphthenate | fluid ounces | 1 |
| 6% manganese naphthenate | do | 1 |
| Union Solvent #30 (the trade name for a selected petroleum solvent containing some aromatics) | gallons | 9 |

Eight pounds of collected sludge from such enamel were mixed with half an ounce Aerosol OT, 2½ pounds water and 2 pounds naphtha and emulsified. The resultant emulsion was most satisfactory in the spraying operation and produced a clear smooth film.

Varnish was also tried which had the following composition, to wit:

| | Pounds |
|---|---|
| Hardened rosin | 5½ |
| Ester gum | 5½ |
| Tung oil | 27 |
| Sardine oil | 1 |
| Linseed oil | 2 |
| Drier | ½ |
| Turpentine | 4 |
| Mineral spirits | 53 |

This varnish was reduced 25% with naphtha in order to render it adapted for spraying. To 16 pounds of the collected sludge one ounce of Aerosol OT and 4 pounds of water were added and the entire mixture agitated and mixed to provide the desired emulsion. With this spray also, a smooth, clear, glossy, and homogeneous film resulted.

Pigmented lacquers, synthetics, and varnishes can also be recovered by this method, although, usually a larger amount of stabilzing agent is necessary as well as somewhat higher pressures in the emulsifying apparatus are required. It has been noticed that after emulsion of the recovered product very high solid paints can be sprayed at the lower pressures than those recovered with the conventional practice.

Solvents of sufficiently low solvency in water are preferable.

It will be noted, in all of the examples given in which the present invention has been illustrated as being used, that the sludge is a sort of emulsion of the finish and water. In preparing a lacquer emulsion in water it is necessary to first make up the base lacquer. The composition of the base lacquer depends upon the use to which the finished lacquer emulsion is to be put. Consequently, there is a wide range of equivalents of the various materials which may be added to the sludge in order to provide the desired stability and in order to restore the proper solvent content. In the examples given, however, it is believed that a sufficient indication of equivalents of such ingredients is set forth.

In the present invention the lacquer base is not first formed and then emulsified. The sludge is already a sort of emulsion in which are present many of the ingredients which would serve to form a lacquer base. The solvents added serve to complete the lacquer base but the lacquer base is completed by adding the required ingredients to the emulsified composition which constitutes the sludge. It will be noted that to the sludge is also added the proper emulsifying agent. The range of emulsifying agents which may be used is also a wide one. Sulfonated castor oil is one which is quite satisfactory, although others which may be used are sodium salts of naphthene sulphonates, sodium naphthenate, thioglycol, sodium thioglycol sulfate, sodium lauryl sulfate, or other alkali metal salts of half ester sulfates of higher fatty alcohols, sodium salt of isopropyl naphthalene sulfate, sodium salt of the sulfuric ester of glycerin monododecyl ether, sodium salt of the sulfuric ester of ethyl dodecyl amide, oleo glycerol sulfate, sulphonates of polymerized terpenes, and sodium hydro abietyl xanthate. Also various soaps such as ammonium resinate, ammonium linoleate, ammonium oleate, sodium oleate, and sodium resinate can be used in some instances.

After the necessary ingredients, such as solvents emulsifying agents or stabilizers, have been added together with the proper quantity of water the mixture is emulsified in an emulsifying machine of any desired type. It will be noted that the ratio of the lacquer phase to the water phase varies between substantially an equal amount of lacquer base and water and three parts of lacquer base to one part of water by weight, considering the lacquer base to consist of the sludge with the solvents and emulsifying agents added thereto. There is thus obtained a water-in-oil emulsion.

It is preferable to add such quantities of solvents as may be necessary to restore the original solvent content of the finish before the spraying operation. The emulsifier or stabilizing agent used will, of course, depend upon the composition of the finish base and the use to which the same is put. With this system of recovery an emulsion has been procured which remains stabilized for a period of six months.

While I have set forth the preferred method of operation I do not wish to limit myself to the precise details set out but desire to avail myself of such variations and modifications as come within the scope of the appended claims.

What I claim as new is:

1. A method of preparing a coating composition in the form of an aqueous emulsion from excess sprayed coating material obtained by directing the overspray into a curtain of water forming a hydrated sludge, adding to said hydrated sludge an organic solvent to restore the solvent content for reuse as a finishing composition, an emulsifying agent and water, the water being sufficient to adjust the components to have present in the finished product an amount not over 50% by weight of the finished product, and thoroughly agitating the mixture to produce a water-in-oil type emulsion capable of use as a spray finish.

2. A method of preparing a coating composition in the form of an aqueous emulsion from excess sprayed coating material obtained by directing the overspray into a curtain of water forming a hydrated sludge, which method comprises thoroughly agitating the said hydrated sludge in the presence of an emulsifying agent, organic solvents in amounts sufficient to restore the solvent content for reuse as a finishing composition, and water in an amount sufficient to adjust the components to have present in the finished product an amount not over 50% by weight of the finished product, to produce a water-in-oil type emulsion capable of use as a spray finish.

JOSEPH G. MECKLER.